(12) United States Patent
Cui et al.

(10) Patent No.: US 11,690,093 B2
(45) Date of Patent: *Jun. 27, 2023

(54) ELECTRONIC DEVICE AND METHOD FOR WIRELESS COMMUNICATION, AND COMPUTER READABLE STORAGE MEDIUM

(71) Applicant: Sony Group Corporation, Tokyo (JP)

(72) Inventors: Qimei Cui, Beijing (CN); Zhenyu Xu, Beijing (CN); Tao Cui, Beijing (CN); Xiaofeng Tao, Beijing (CN); Bowen Cai, Beijing (CN); Jing Liu, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/553,805

(22) Filed: Dec. 17, 2021

(65) Prior Publication Data

US 2022/0110133 A1  Apr. 7, 2022

Related U.S. Application Data

(63) Continuation of application No. 16/962,234, filed as application No. PCT/CN2019/085981 on May 8, 2019, now Pat. No. 11,234,249.

(30) Foreign Application Priority Data

May 14, 2018 (CN) .......................... 201810456802.1

(51) Int. Cl.
*H04W 28/20* (2009.01)
*H04W 72/542* (2023.01)
(Continued)

(52) U.S. Cl.
CPC .......... *H04W 72/542* (2023.01); *H04L 69/28* (2013.01); *H04W 28/20* (2013.01); *H04W 72/0446* (2013.01); *H04W 72/23* (2023.01)

(58) Field of Classification Search
CPC .............................. H04W 72/08; H04L 69/28
See application file for complete search history.

(56) References Cited

U.S. PATENT DOCUMENTS

| | | |
|---|---|---|
| 2019/0297514 A1 | 9/2019 | Pao et al. |
| 2021/0007101 A1 | 1/2021 | Tooher et al. |

(Continued)

FOREIGN PATENT DOCUMENTS

WO  2018/063944 A1  4/2018

OTHER PUBLICATIONS

International Search Report and Written Opinion dated Jul. 18, 2019 for PCT/CN2019/085981 filed on May 8, 2019, 9 pages including English Translation of the International Search Report.

(Continued)

*Primary Examiner* — Michael T Vu
(74) *Attorney, Agent, or Firm* — Xsensus LLP

(57) ABSTRACT

The present invention provides an electronic device and method for wireless communication, and a computer readable storage medium. The electronic device comprises a processing circuit configured to: set a first timer used for counting the activation time of a current bandwidth part (BWP) for a user equipment on an unlicensed frequency band; and switch, when the first timer times out, the user equipment onto another BWP on the unlicensed frequency band.

18 Claims, 11 Drawing Sheets

(51) Int. Cl.
*H04L 69/28* (2022.01)
*H04W 72/0446* (2023.01)
*H04W 72/23* (2023.01)

(56) References Cited

U.S. PATENT DOCUMENTS

2021/0126763 A1* 4/2021 Zhou ................ H04W 74/0841
2021/0203536 A1 7/2021 Wilson et al.

OTHER PUBLICATIONS

Mediatek Inc., "Summary of Bandwidth Part Operation," 3GPP TSG RAN WG1 Meeting 90bis, R1-1718901, Prague, CZ, Oct. 9-13, 2017, 14 pages.

Oppo, "Timer based BWP switching," 3GPP TSG RAN WG2 No. 99-Bis, R2-1710126, Prague, Czech Republic, Oct. 9-13, 2017, pp. 1-3.

Wilus Inc., "Remaining issues on BWP switching," 3GPP TSG RAN WG1 Meeting No. 92bis, R1-1805244, Sanya, China, Apr. 16-20, 2018, 3 pages.

Huawei et al: "Discussion on BWP operation for NR-U", 3GPP Draft; R2-1808468 Discussion on BWP Operation for NR-U, 3rd Generation Partnership Project (3GPP), Mobile Competence Centre ; 650, Route Des Lucioles ; F-06921 Sophia-Antipolis Cedex ; France vol. RAN WG2, No. Busan, Korea; May 21, 2018-May 25, 2018 May 11, 2018 (May 11, 2018), XP051519864, Retrieved from the Internet:URL: Mtp://www.3gpp.orgiftp/tsg%5Fran/WG2%5FRL2/TSGR2Y05F102/ Docs/R2%2D1808468%2Ezip.

Sony: "High Level Views on NR-U BWP", 3GPP Draft; R1-1720475, 3rd Generation Partnership Project (3GPP), Mobile Compei Ence Centre ; 650, Route Des Lucioles ; F-06921 Sophia-Antipolis Cedex ; France vol. RAN WG1, No. Reno, US; Nov. 27, 2017-Dec. 2, 2017 Nov. 18, 2017 (Nov. 18, 2017), XP051370027, Retrieved from the Internet:URL:http://www.3gpp.org/ftp/tsg%5Fran/WG1%05FRL1/TSGIR1%5F91/ Docs/.

* cited by examiner

ELECTRONIC DEVICE AND METHOD FOR WIRELESS COMMUNICATION, AND COMPUTER READABLE STORAGE MEDIUM

The present application is a continuation of U.S. application Ser. No. 16/962,234, filed Jul. 15, 2020, which is based on PCT filing PCT/CN2019/085981, filed May 8, 2019, which claims the priority to Chinese Patent Application No. 201810456802.1, filed May 14, 2018, with the China National Intellectual Property Administration, each of which is incorporated herein by reference in its entirety.

FIELD

The present disclosure relates to the technical field of wireless communications, and in particular to spectrum resources utilization technology on an unlicensed frequency band. More specifically, the present disclosure relates to an electronic apparatus and a method for wireless communications and a computer-readable storage medium.

BACKGROUND

As a next generation of radio access scheme of Long Term Evolution (LTE), New Radio (NR) is a radio access technology (RAT) different from the LTE. NR is an access technology applicable to various use cases such as Enhanced mobile broadband (eMBB), Massive machine type communications (mMTCs) and Ultra reliable and low latency communications (URLLCs).

Due to the new features of NR such as a wider bandwidth and flexible configuration, a concept of Bandwidth Part (BWP) is introduced in NR. In particular, some of user equipment (UE) may not need or cannot support such a wide bandwidth, so the UE may only use a part of the bandwidth with the BWP technology, thereby improving the flexibility and compatibility of the system. Moreover, energy consumption of the UE can be reduced with the BWP technology.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, an electronic apparatus for wireless communications is provided. The electronic apparatus includes processing circuitry. The processing circuitry is configured to set a first timer for timing an activation time of a current bandwidth part BWP for use by user equipment on an unlicensed frequency band, and switch the user equipment to another BWP on the unlicensed frequency band when the first timer expires.

According to another aspect of the present disclosure, a method for wireless communications is provided. The method includes: setting a first timer for timing activation time of a current bandwidth part BWP for use by user equipment on an unlicensed frequency band, and switching the user equipment to another BWP on the unlicensed frequency band when the first timer expires.

According to an aspect of the present disclosure, an electronic apparatus for wireless communications is provided. The electronic apparatus includes processing circuitry. The processing circuitry is configured to set a first timer for user equipment, the first timer being used for timing activation time of a current bandwidth part BWP for use by the user equipment on an unlicensed frequency band; and determine that the user equipment is to be switched to another BWP on the unlicensed frequency band when the first timer expires.

According to an aspect of the present disclosure, a method for wireless communications is provided. The method includes: setting a first timer for user equipment, the first timer being used for timing activation time of a current bandwidth part BWP for use by the user equipment on an unlicensed frequency band; and determining that the user equipment is to be switched to another BWP on the unlicensed frequency band when the first timer expires.

According to other aspects of the present disclosure, there are further provided computer program codes and computer program products for implementing the methods for wireless communications above, and a computer readable storage medium having recorded thereon the computer program codes for implementing the methods for wireless communications described above.

With the electronic apparatuses and methods according to the present disclosure, the activation time of a BWP on an unlicensed frequency band for use by the user equipment is controlled by using timers, such that the BWP is utilized more flexibly, thereby improving spectrum utilization efficiency, and reducing a waiting time of the user equipment.

These and other advantages of the present disclosure will be more apparent by illustrating in detail a preferred embodiment of the present disclosure in conjunction with accompanying drawings below.

BRIEF DESCRIPTION OF THE DRAWINGS

To further set forth the above and other advantages and features of the present disclosure, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present disclosure and should not be construed as a limitation to the scope of the disclosure. In the accompanying drawings.

DETAILED DESCRIPTION OF EMBODIMENTS

An exemplary embodiment of the present disclosure will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present disclosure due to unnecessary details, only a device structure and/or processing steps closely related to the solution according to the present disclosure are illustrated in the accompanying drawing, and other details having little relationship to the present disclosure are omitted.

First Embodiment

As mentioned above, the technology regarding BWP is newly introduced in the NR. Generally, BWP is adopted on a licensed frequency band. If BWP is adopted on an unlicensed frequency band, it is uncertain whether the user equipment can occupy a BWP. This is because that in the use of the unlicensed frequency band resources, there is non-continuity, for example, setting of Maximum Channel Occupancy Time (MCOT), and opportunity, for example, competition due to coexistence with other communication systems. In a case that the user equipment uses resources of BWP for communication, it is required to firstly perform channel detection by the user equipment to confirm that a current channel is available. If the channel detection indicates that the current channel is unavailable, the user equipment may be required to be switched to another BWP to continue communication, where the switching indicates a de-activation of a current BWP and an activation of another BWP. The embodiment aims to provide a timely and reliable manner of realize such switching.

Figure 1:
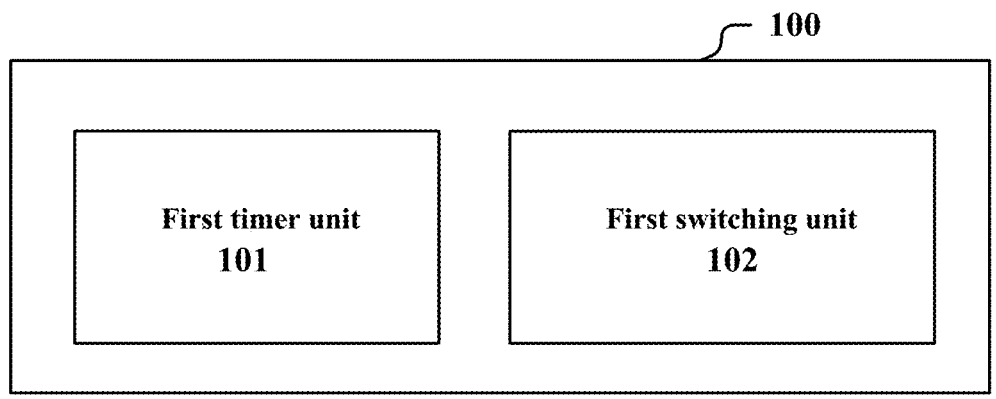
FIG. 1 is a block diagram showing functional modules of an electronic apparatus for wireless communications according to an embodiment of the present disclosure.

FIG. 1 is a block diagram showing functional modules of an electronic apparatus 100 for wireless communications according to an embodiment of the present disclosure. As shown in FIG. 1, the electronic apparatus 100 includes: a first timer unit 101 and a first switching unit 102. The first timer unit 101 is configured to set a first timer for timing activation time of a current BWP for use by user equipment on an unlicensed frequency band. The first switching unit 102 is configured to switch the user equipment to another BWP on the unlicensed frequency band when the first timer expires.

The first timer unit 101 and the first switching unit 102 may be implemented by one or more processing circuitry, and the processing circuitry, for example, may be implemented as a chip. Moreover, it should be noted that, the functional units in the apparatus shown in FIG. 1 are only logic modules which are divided based on the specific functions thereof, and are not intended to limit the specific implementations. This also applies to subsequent description about examples of other electronic apparatus.

The electronic apparatus 100, for example, may be arranged on user equipment (UE) side or may be communicatively connected to the UE. It should be noted that the electronic apparatus 100 may be implemented at a chip level or a device level. For example, the electronic apparatus 100 may function as user equipment itself, or may include an external device such as a memory and a transceiver (not shown in the FIG. 1). The memory may be configured to store programs and related data information for implementing various functions by the user equipment. The transceiver may include one or more communication interfaces to support communication with different devices (for example, a base station and other user equipment). The implementation of the transceiver is not limited here. This also adapts to subsequent description of other configuration examples of the electronic apparatus on the UE side.

In the electronic apparatus 100, the first timer is provided for timing the activation time of the current BWP. Within a time period defined by a timing duration of the first timer, the activated BWP for the user equipment is the current BWP.

For example, the activation and de-activation of BWP may be performed based on Downlink Control Information (DCI) scheduling, and the DCI is transmitted via a Physical Downlink Control Channel (PDCCH). However, on the unlicensed frequency band, the transmission of DCI depends on successful occupation of the channel, so there may be a case where the DCI cannot be acquired. In order to perform BWP switching, the first timer may be used to determine the timing of the switching.

In an embodiment, the first timer unit 101 is further configured to start the first timer when the current BWP is activated. The timing duration of the first timer is variable, for example, the timing duration of the first timer may be determined by a base station in accordance with a characteristic of data to be transmitted. The characteristic of data includes, for example, the magnitude of the data amount.

The timing duration of the first timer may be acquired via a radio resource control (RRC) signaling. The user equipment is switched to another BWP when the first timer expires. As mentioned above, the switching here includes de-activating the current BWP and activating another BWP. Another BWP may be a default BWP, an initial BWP, or another BWP among multiple BWPs which are configured by the RRC signaling.

For example, in a standalone scenario, that is, without the assistance of a licensed frequency band, the control signaling is also transmitted on an unlicensed frequency band, and the first switching unit 102 may switch the user equipment to a default BWP or an initial BWP when the first timer expires. In a License Assisted Access (LAA) scenario, since the control channel may be transmitted on a licensed frequency band, information of DCI scheduling can be acquired, and the first switching unit 102 may directly switch the user equipment to another BWP in accordance with the DCI scheduling.

Figure 2:
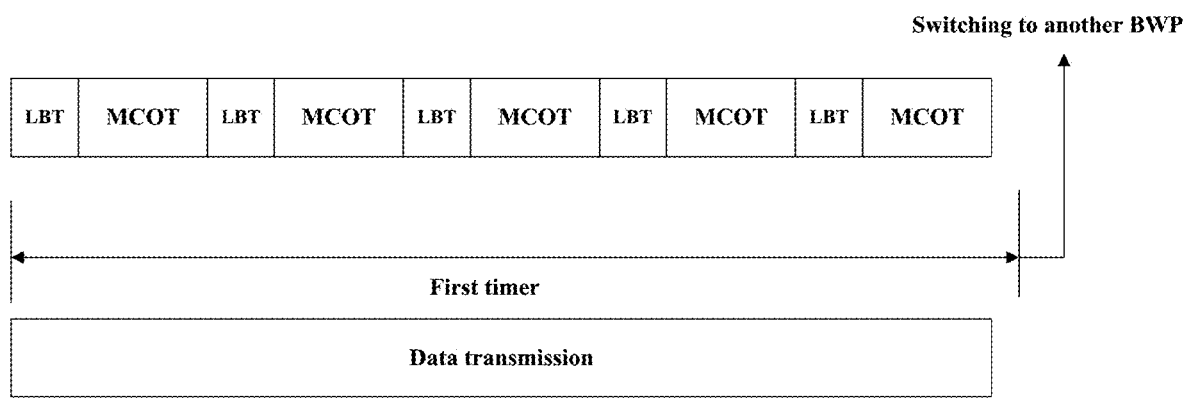
FIG. 2 is a diagram showing an example of data transmission during a timing duration of a first timer.
Figure 3:
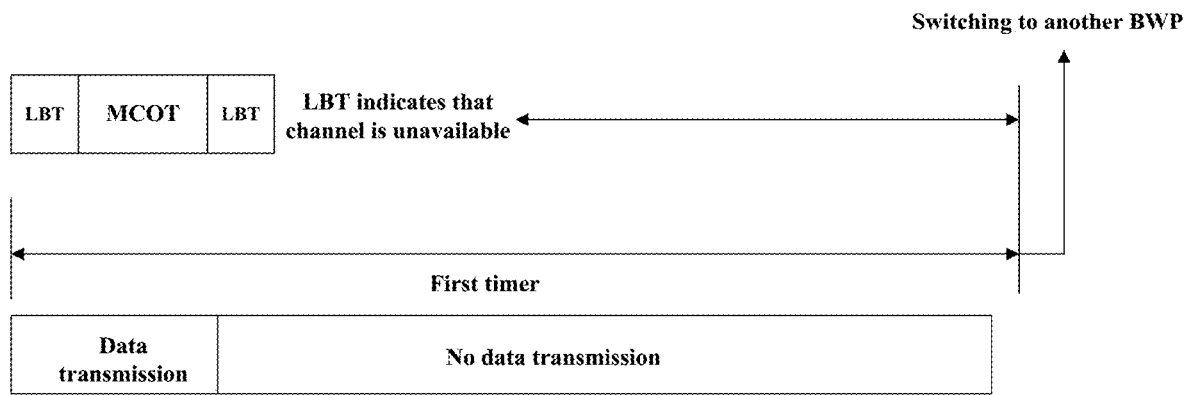
FIG. 3 is a diagram showing another example of data transmission during a timing duration of a first timer.

FIG. 2 and FIG. 3 are diagrams showing data transmission during a timing duration of a first timer respectively. In an activated BWP on an unlicensed frequency band, channel detection, such as Listen Before Talk (LBT), is performed firstly. When LBT indicates that a current channel is available, data transmission is performed on the current channel and maximum time during which the channel is occupied each time is MCOT. As shown in FIG. 2, within the timing duration of the first timer, each LBT indicates that the channel is available, so that data transmission is performed until the first timer expires. As shown in FIG. 3, after data transmission is performed for a time duration of one or several pieces of MCOT, the LBT indicates that the channel is unavailable, so that data transmission cannot be performed in subsequent time, and the user equipment waits until the first timer expires and is switched to another BMP.

Figure 4:
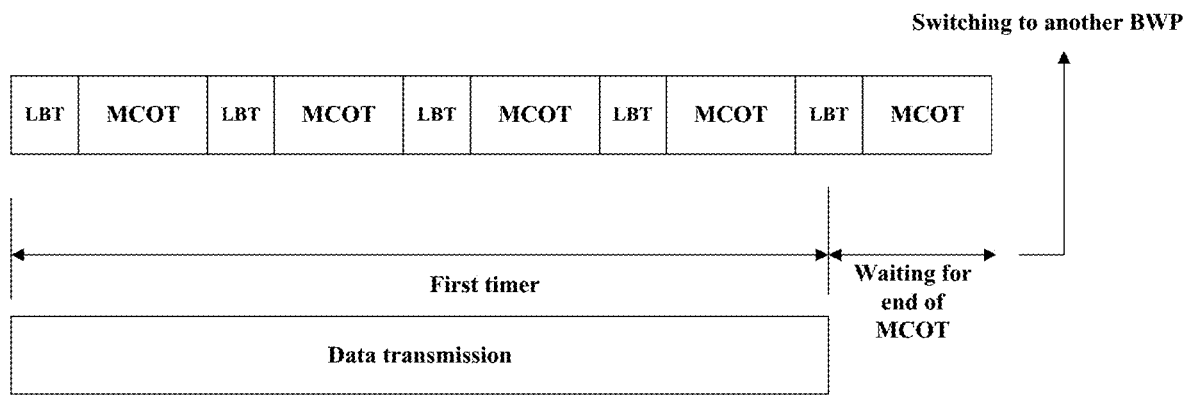
FIG. 4 is a schematic diagram showing a case that a current channel is continually occupied when the first timer expires.

In addition, the first switching unit 102 may be further configured to continue occupying the current channel for a time duration of one piece of MCOT in a case that channel detection indicates that the current channel is available when the first timer expires, which can effectively ensure the integrity of data transmission. FIG. 4 is a schematic diagram showing a case that a current channel is continually occupied for a time duration of one piece of MCOT when a first timer expires.

In an example, the first switching unit 102 may be further configured to detect Reference Signal Reception Power (RSRP) of a current beam, and determine whether to switch to another BWP based on the RSRP. For example, the first switching unit 102 may be configured to compare a detected RSRP with a preset threshold, and determine to switch to another BWP if the detected RSRP is lower than the preset threshold. In this case, a beam management mechanism or a radio link management mechanism may be reused in the BWP switching scenario. It should be noted that, in this example, the first timer may or may not be provided.

With the electronic apparatus 100 in the embodiment, the activation time of a BWP for use by the user equipment on an unlicensed frequency band is controlled by using the first timer, such that the BWP can be utilized more flexibly, thereby improving spectrum utilization efficiency, and reducing waiting time of the user equipment.

Second Embodiment

Figure 5:
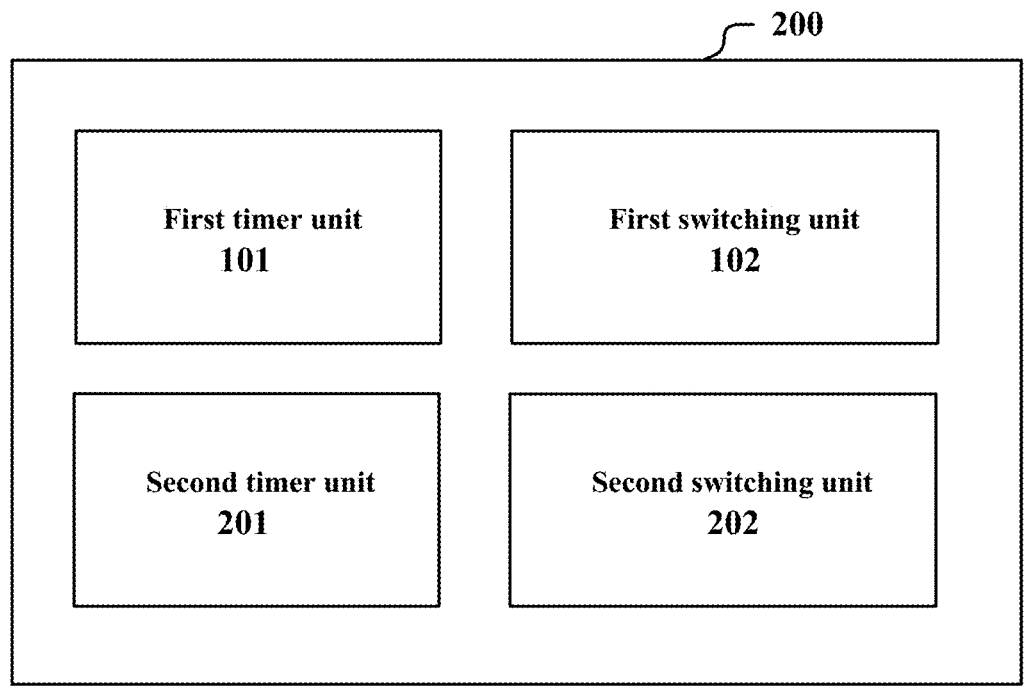
FIG. 5 is a block diagram showing functional modules of an electronic apparatus for wireless communications according to another embodiment of the present disclosure.

FIG. 5 is a block diagram showing functional modules of an electronic apparatus 200 for wireless communications according to another embodiment of the present disclosure. Besides the first timer unit 101 and the first switching unit 102 which are described with reference to FIG. 1, the electronic apparatus 200 further includes: a second timer unit 201 and a second switching unit 202. The second timer unit 201 is configured to set a second timer for timing a time duration during which the user equipment does not occupy the current BWP in an activated state to perform transmission. The second switching unit 202 is configured to switch the user equipment to another BWP on the unlicensed frequency band when the second timer expires.

Similarly, the second timer unit 201 and the second switching unit 202 may be implemented by one or more processing circuitry, and the processing circuitry, for example, may be implemented as a chip. Moreover, it should be noted that, functional units in the apparatus shown in FIG. 5 are only logic modules which are divided according to the specific functions thereof, and are not intended to limit the specific implementations. The electronic apparatus 200, for example, may be provided on user equipment (UE) side or may be communicatively connected to the UE.

In the embodiment, besides the first timer, a second timer is further provided. The first timer is configured to time the activation time of the current BWP, and the second timer is configured to time a time duration during which the UE does not occupy the currently activated BWP to perform transmission. For example, when the channel detection indicates that a channel is unavailable, the second timer times the time during which the channel is unavailable. When the time during which the channel is unavailable exceeds a timing duration of the second timer, that is, the second timer expires, the second switching unit 202 switches the UE from the current BWP to another BWP.

It can be understood that in a case that it is continuously detected that the channel is unavailable, implying that the current BWP is busy and it is difficult for the UE to occupy the channel to perform transmission in a short time, so it is expected to switch the UE to another BWP to continue performing data transmission. In this case, if the time when the second timer expires is earlier than the time when the first timer expires, the waiting of the UE may be ended in advance, and the UE may be switched to a new BWP to perform transmission. In this way, the waiting time and energy consumption of the UE are reduced and the spectrum utilization efficiency is improved.

In an example, a timing duration of the second timer is shorter than that of the first timer. For example, the timing duration of the second timer may be a length of N pieces of MCOT, where N is a natural number which is equal to or larger than 2. The timing duration of the second timer may be determined by a base station and notified to the user equipment via RRC signaling.

Figure 6:
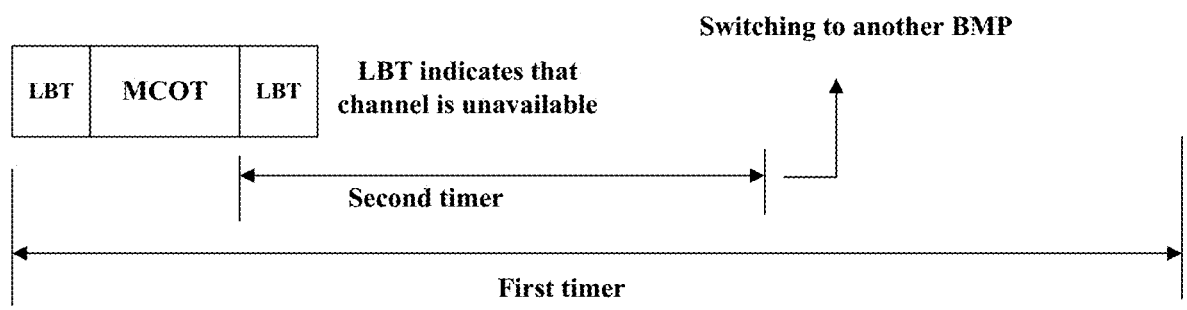
FIG. 6 is a diagram showing an example of a second timer and a first timer.

FIG. 6 is a diagram showing an example of a second timer and a first timer. It can be seen that when the second timer expires, the first timer does not expire, and BWP switching occurs at this time. It should be understood that FIG. 6 only shows an example, and the first timer may expire first, depending on factors such as the time duration during which the channel is unavailable.

When the second timer expires, the second switching unit 202 performs the BWP switching, and when the first timer expires, the first switching unit 102 performs the BWP switching. The BWP switching performed by the first switching unit 102 and the second switching unit 202 may be different according to whether there is assistance of control signaling on the licensed frequency band.

Figure 7:
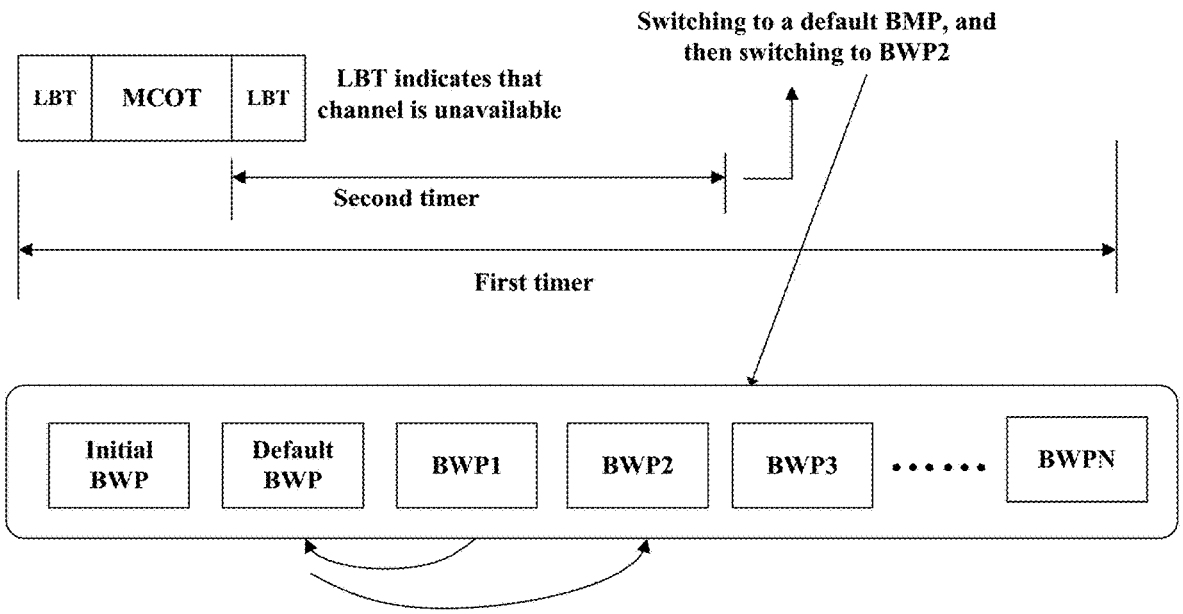
FIG. 7 is a schematic diagram showing BWP switching in a standalone scenario.

For example, in the standalone scenario, the first switching unit 102 or the second switching unit 202 may switch the user equipment to a default BWP on the unlicensed frequency band. In addition, the first switching unit 102 or the second switching unit 202 is further configured to acquire the scheduling DCI on the default BWP to determine a new BWP to be activated, and switch the user equipment to the new BWP. FIG. 7 is a schematic diagram showing BWP switching in a standalone scenario. In FIG. 7, BWP1 represents the currently activated BWP, the LBT detection indicates that the current channel is unavailable, and the unavailable state of the current channel continues until the second timer expires. Since the channel is unavailable, transmission cannot be performed for PDCCH or PUCCH. The second switching unit 202 switches the user equipment to the default BWP, transmits a switching request to a base station on the default BWP, and receives the scheduling DCI from the base station, where the scheduling DCI indicates that BWP2 is the new BWP. Then, the second switching unit 202 switches the user equipment from the default BWP to BWP2.

Figure 8:
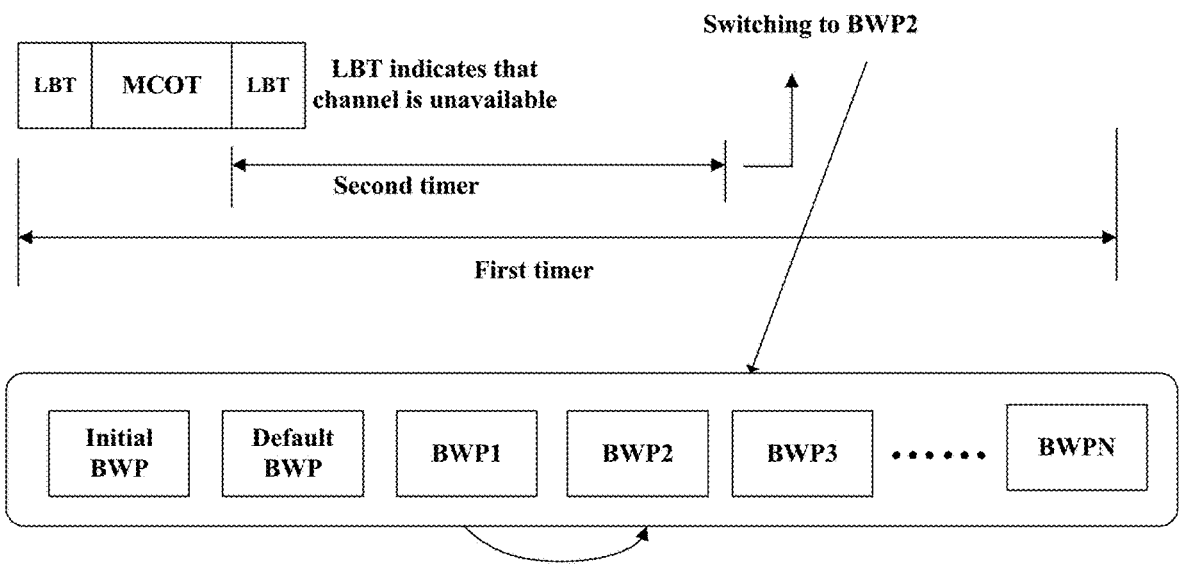
FIG. 8 is a schematic diagram showing BWP switching in a Licensed Assisted Access (LAA) scenario.

On the other hand, in the LAA scenario, the first switching unit 102 or the second switching unit 202 may receive the scheduling DCI on the licensed frequency band, and determines and activates a new BWP based on the DCI, to directly switch the user equipment to the new BWP. In the LAA scenario, PDCCH is continuously transmitted on the licensed frequency band. Therefore, when the second timer 202 or the first timer 102 expires, the user equipment may send a switching request to the base station. The base station may send scheduling DCI to the user equipment to instruct the user equipment to switch to the new BWP. FIG. 8 is a schematic diagram showing BWP switching in a License Assisted Access (LAA) scenario. It can be seen that in the LAA scenario, it is unnecessary to firstly switch the user equipment to the default BWP as a transition, such that the delay caused by switching can be further reduced.

As another example, the second timer unit 201 is configured to start the second timer when a piece of MCOT ends, and interrupt the second timer when the user equipment receives data from the base station or when the channel detection by the user equipment indicates that the current channel is available. For example, for uplink transmission, the user equipment is required to perform channel detection, such as LBT, when the MCOT ends. Therefore, if the channel detection indicates that the current channel is available, implying that the user equipment may continue occupying the currently activated BWP to perform data transmission, the timing of the second timer is interrupted. For downlink transmission, the channel detection is performed by the base station, and the user equipment does not know the result of the channel detection, the user equipment may determine to continue occupying the currently activated BWP to perform data transmission only when receiving data from the base station, and at this time, the timing of the second timer is interrupted.

With the electronic apparatus 200 in the embodiment, a second timer is arranged to further reduce the waiting time and energy consumption of the user equipment, thereby improving the spectrum utilization efficiency.

Third Embodiment

Figure 9:
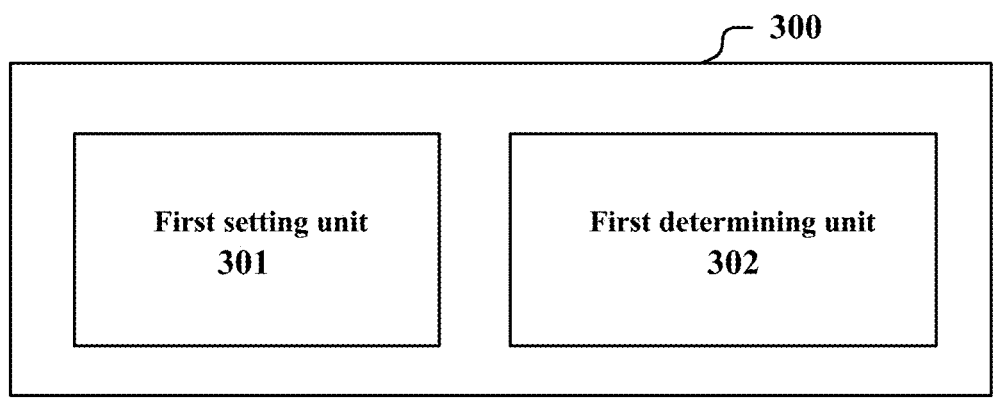
FIG. 9 is a block diagram showing functional modules of an electronic apparatus for wireless communications according to another embodiment of the present disclosure.

FIG. 9 is a block diagram showing functional modules of an electronic apparatus 300 for wireless communications according to another embodiment of the present disclosure. As shown in FIG. 9, the electronic apparatus 300 includes: a first setting unit 301 and a first determining unit 302. The first setting unit 301 is configured to set a first timer for user equipment, and the first timer is used for timing activation time of a current BWP for use by the user equipment on an unlicensed frequency band. The first determining unit 302 is configured to determine that the user equipment is to be switched to another BWP on the unlicensed frequency band.

The first setting unit 301 and the first determining unit 302 may be implemented by one or more processing circuitry, and the processing circuitry, for example, may be implemented as a chip. Moreover, it should be noted that, functional units in the apparatus shown in FIG. 9 are only logic modules which are divided according to the specific functions thereof, and are not intended to limit the implementations.

The electronic apparatus 300, for example, may be provided on a base station side or may be communicatively connected to the base station. It should be noted that the electronic apparatus 300 may be implemented at a chip level or a device level. For example, the electronic apparatus 300 may function as a base station itself, or may include an external device such as a memory and a transceiver (not shown in FIG. 9). The memory may be configured to store programs and related data information for implementing various functions by the base station. The transceiver may include one or more communication interfaces to support communication with different devices (for example, user equipment and other base stations). The implementation of the transceiver is not limited here. This also adapts to the subsequent description of other configuration examples of electronic apparatus on the base station side.

The first setting unit 301 is configured to set a first timer for user equipment to time activation time of an activated BWP for use by the user equipment on an unlicensed frequency band. The first timer corresponds to the first timer on the user equipment side described in the above embodiment, and is used by the base station side to acquire utilizing timing of a currently activated BWP. Specific details may refer to the first embodiment, which are not described herein again.

For example, the first setting unit 301 may start the first timer when the current BWP is activated. The timing duration of the first timer is variable. The first setting unit 301 may determine, in accordance with a characteristic of data to be transmitted, the timing duration of the first timer. The characteristic of data includes, for example, the magnitude of the data amount. In addition, the first setting unit 301 notifies the user equipment of the timing duration of the first timer via RRC signaling, so that a first timer having the same timing duration is maintained on the user equipment side.

When the first timer expires, the user equipment is switched to another BWP. The first determining unit 302 may determine that the user equipment is to be switched to another BWP based on the expiration of the first timer at the base station side. In the standalone scenario, another BWP may be the default BWP or the initial BWP. In the LAA scenario, another BWP may be a BWP among BWPs which have been configured for the user equipment.

In addition, the first determining unit 302 may be further configured to continue occupying the current channel for a time duration of one piece of MCOT in a case that channel detection indicates that the current channel is available, when the first timer expires, which effectively ensures the integrity of data transmission.

In an example, the first determining unit 302 may be further configured to determine, based on reference signal receiving power (RSRP) of a current beam detected by the UE, whether the UE is to be switched to another BWP. For example, the first determining unit 302 may compare the detected RSRP with a preset threshold, and determine that the user equipment is to be switched to another BWP if the detected RSRP is lower than the preset threshold. In this case, a beam management mechanism or a radio link management mechanism may be reused in the BWP switching scenario. It should be noted that in the example, the first timer may or may not be set. Alternatively, it may be determined by the user equipment whether to switch to another BWP, and the first determining unit 302 acquires an indication from the user equipment that it is to be switched to another BWP.

With the electronic apparatus 100 in the embodiment, the activation time of a BWP for use by user equipment on an unlicensed frequency band is controlled by using a first timer, such that the BWP can be utilized more flexibly, thereby improving spectrum utilization efficiency, and reducing waiting time of the user equipment.

Fourth Embodiment

Figure 10:
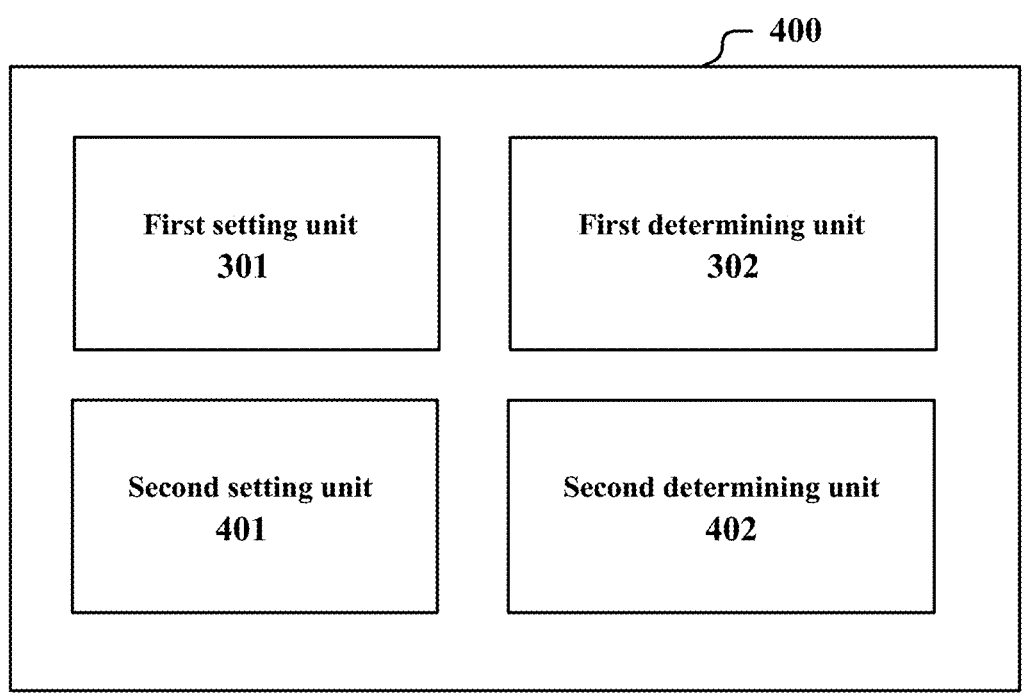
FIG. 10 is a block diagram showing functional modules of an electronic apparatus for wireless communications according to another embodiment of the present disclosure.

FIG. 10 is a block diagram showing functional modules of an electronic apparatus 400 for wireless communications according to another embodiment of the present disclosure. Besides the first setting unit 301 and the first determining unit 302 shown in FIG. 9, the electronic apparatus 400 further includes: a second setting unit 401 and a second determining unit 402. The second setting unit 401 is configured to set a second timer for the user equipment, which is used for timing a time duration during which the user equipment does not occupy the current BWP in an activated state to perform transmission. The second determining unit 402 is configured to determine that the user equipment is to be switched to another BWP on the unlicensed frequency band when the second timer expires.

Similarly, the second setting unit 401 and the second determining unit 402 may be implemented by one or more processing circuitry, and the processing circuitry, for example, may be implemented as a chip. Moreover, it should be noted that, functional units in the apparatus shown in FIG. 10 are only logic modules which are divided according to the specific functions thereof, and are not intended to limit the implementations. The electronic apparatus 400, for example, may be provided on a base station side or may be communicatively connected to a base station.

In the embodiment, besides the first timer, a second timer is further provided. The second timer corresponds to the second timer on the user equipment side described in the above embodiment, and is used by the base station side to acquire a timing duration during which no data transmission is performed on the currently activated BWP. Specific details may refer to the second embodiment, which are not described herein again.

For example, a timing duration of the second timer is shorter than that of the first timer. For example, the timing duration of the second timer is a length of N pieces of maximum channel occupation time, where N is a natural number which is equal to or larger than 2. The second setting unit 401 may set the timing duration of the second timer based on, such as data transmission requirements, current communication environment, or empirical values, and notify the timing duration of the second timer to the user equipment via RRC signaling.

For example, in the standalone scenario, the second determining unit 401 determines that the user equipment is to be switched to a default BWP on the unlicensed frequency band when the second timer expires. Therefore, the second determining unit 401 may acquire a switching request from the user equipment on the default BWP. Accordingly, the second determining unit 401 may further be configured to transmit scheduling DCI on the default BWP to notify the user equipment of a new BWP to be activated, and the user equipment is to be switched to the new BWP. Practically, the first timer may expire firstly, and in this case, the above operations are performed by the first determining unit 301.

In the LAA scenario, the second determining unit 401 transmits, for example, in response to a switching request received from the user equipment on the licensed frequency band, the scheduling DCI on the licensed frequency band when the second timer expires, to notify the UE of a new BWP to be activated, and the UE is to be switched to the new BWP. Practically, the first timer may expire firstly, and in this case, the above operations are performed by the first determining unit 301.

In an example, the second determining unit 401 is configured to start the second timer when a piece of MCOT ends, and interrupt the second timer when receiving data from the UE or channel detection by the base station indicates that a current channel is available. For example, for downlink transmission, the base station is required to perform channel detection, such as LBT, when a piece of MCOT ends. Therefore, if the channel detection indicates that the current channel is available, implying that the currently activated BWP can be continuously occupied to perform data transmission, the timing of the second timer is interrupted. For uplink transmission, the channel detection is performed by the user equipment, and the base station does not know the result of the channel detection, so the base station may determine that the currently activated BWP can be continuously occupied to perform data transmission only when receiving data from the user equipment, and at this time the timing of the second timer is interrupted.

With the electronic apparatus 400 in the embodiment, a second timer is arranged to further reduce the waiting time and energy consumption of the UE and improve the spectrum utilization efficiency.

Fifth Embodiment

In the process of describing the electronic apparatus for wireless communications in the embodiments described above, obviously, some processing and methods are also disclosed. Hereinafter, an overview of the methods is given without repeating some details disclosed above. However, it should be noted that, although the methods are disclosed in a process of describing the electronic apparatus for wireless communications, the methods do not certainly employ or are not certainly executed by the aforementioned components. For example, the embodiments of the electronic apparatus for wireless communications may be partially or completely implemented with hardware and/or firmware, the methods for wireless communications described below may be executed by a computer-executable program completely, although the hardware and/or firmware of the electronic apparatus for wireless communications can also be used in the methods.

Figure 11:
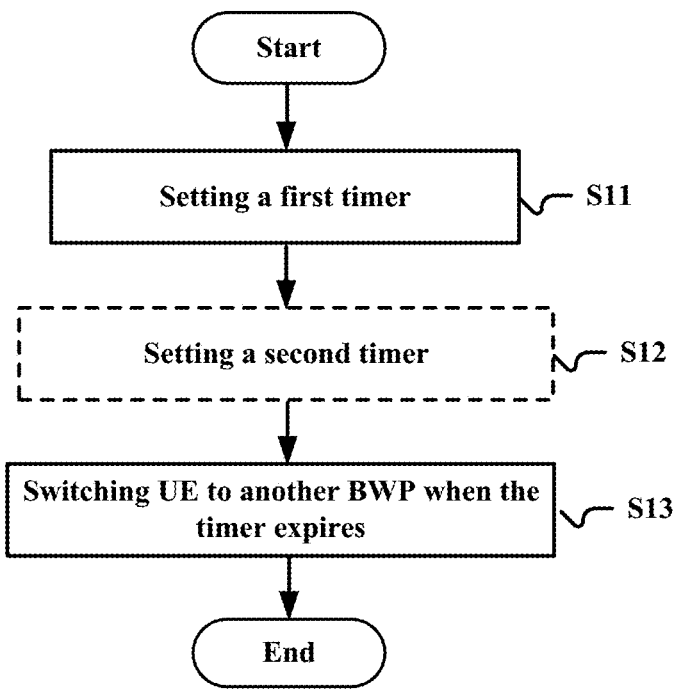
FIG. 11 is a flow chart showing a method for wireless communications according to an embodiment of the present disclosure.

FIG. 11 is a flowchart showing a method for wireless communications according to an embodiment of the present disclosure. As shown in FIG. 11, the method includes: setting a first timer (S11) for timing activation time of a current BWP for use by UE on an unlicensed frequency band; and switching the UE to another BWP on the unlicensed frequency band when the first timer expires (S13). The method, for example, is performed on the user equipment side.

For example, the first timer may be started when the current BWP is activated. The timing duration of the first timer is variable, for example, the timing duration of the first timer may be determined by a base station in accordance with a characteristic of data to be transmitted such as data amount. The timing duration of the first timer may be acquired via RRC signaling.

In addition, although not shown in FIG. 11, the method may further include: continuously occupying the current channel for a time duration of one piece of MCOT in a case that channel detection indicates that the current channel is available, when the first timer expires. RSRP of a current beam may also be detected, and it is determined, based on the RSRP, whether to switch to another BWP. The switching includes deactivating the current BWP and activating another BWP.

As shown by a dashed line block in FIG. 11, the method may further include a step S12: setting a second timer for timing a time duration during which the UE does not occupy the current BWP in an activated state to perform transmission. In addition, the step S13 further includes: switching the UE to another BWP on the unlicensed frequency band when the second timer expires.

A timing duration of the second timer may be shorter than that of the first timer. For example, the timing duration of the second timer is a length of N pieces of Maximum Channel Occupancy Time, where N is a natural number which is equal to or larger than 2.

The second timer may be started when a piece of MCOT ends, and the second timer may be interrupted when the UE receives data from a base station or channel detection by the UE indicates that a current channel is available.

In step S13, in the standalone scenario, the UE is switched to a default BWP on the unlicensed frequency band when the first timer expires or the second timer expires. Then scheduling DCI is acquired on the default BWP to determine a new BWP to be activated, and the UE is switched to the new BWP. In the LAA scenario, the UE is switched to a new BWP when the first timer expires or the second timer expires, where the new BWP is determined and activated via scheduling DCI received on the licensed frequency band.

Figure 12:
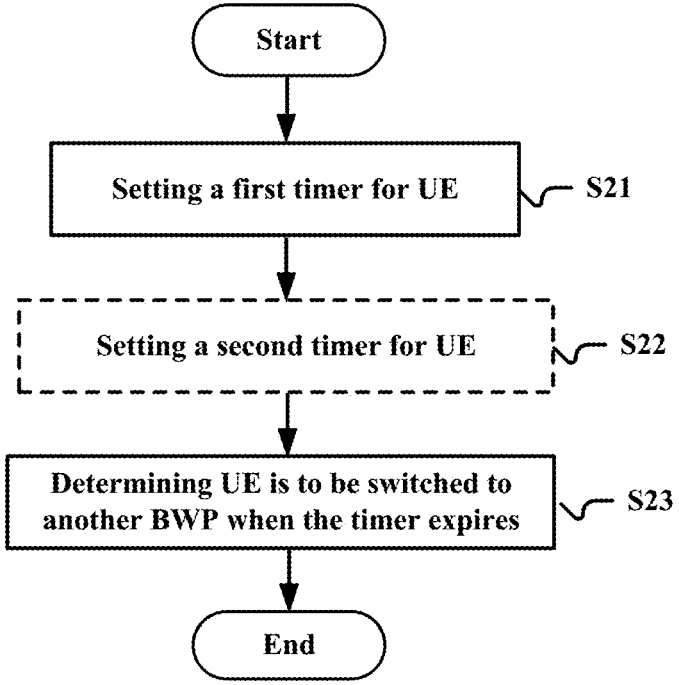
FIG. 12 is a flow chart showing a method for wireless communications according to another embodiment of the present disclosure.

FIG. 12 is a flowchart showing a method for wireless communications according to another embodiment of the present disclosure. As shown in FIG. 12, the method includes: setting a first timer for user equipment (S21), the first time being used for timing activation time of a current bandwidth part BWP for use by the user equipment on an unlicensed frequency band; and determining that the UE is to be switched to another BWP on the unlicensed frequency band when the first timer expires (S23). The method, for example, is performed on the base station side.

The first timer is started when the current BWP is activated, where a timing duration of the first timer is variable. For example, the timing duration of the first timer may be determined in accordance with a characteristic of data to be transmitted. The timing duration may be notified to the UE via RRC signaling.

As shown by a dashed line block in FIG. 12, the method may further include a step S22: setting a second timer for the UE, which is used for timing a time duration during which the UE does not occupy the current BWP in an activated state to perform transmission. In this case, step S13 further includes: determining that the UE is to be switched to another BWP on the unlicensed frequency band when the second timer expires.

For example, the second timer may be started when a piece of MCOT ends, and the second timer may be interrupted when receiving data from the UE or channel detection by the base station indicates that a current channel is available.

A timing duration of the second timer is shorter than that of the first timer. For example, the timing duration of the second timer is a length of N pieces of MCOTs, where N is a natural number which is equal to or larger than 2.

In step S13, it is determined that the UE is to be switched to a default BWP on the unlicensed frequency band when the first timer expires or the second timer expires. Then, scheduling DCI is transmitted on the default BWP to notify the UE of a new BWP to be activated, and the UE is to be switched to the new BWP. Alternatively, the scheduling DCI is transmitted on the licensed frequency band when the first timer expires or the second timer expires to notify the UE of a new BWP to be activated, and the UE is to be switched to the new BWP.

It should be noted that above methods may be utilized in combination or separately. Details of the above methods are described in the first to fourth embodiments, and are not described here.

The technology according to the present disclosure is applicable to various products.

For example, the electronic apparatus 300 or 400 may be implemented as various base stations. The base station may be implemented as any type of evolution Node B (eNB) or gNB (a 5G base station). The eNB includes, for example, a macro eNB and a small eNB. The small eNB may be an eNB covering a cell smaller than a macro cell, such as a pico eNB, a micro eNB, and a home (femto) eNB. The case for the gNB is similar to the above. Alternatively, the base station may be implemented as any other type of base station, such as a NodeB and a base transceiver station (BTS). The base station may include a main body (that is also referred to as a base station apparatus) configured to control radio communication, and one or more remote radio heads (RRHs) disposed in a different place from the main body. In addition, various types of user equipments may each operate as the base station by temporarily or semi-persistently executing a base station function.

The electronic apparatus 100 or 200 may be implemented as various user equipments. The user equipment may be implemented as a mobile terminal (such as a smartphone, a tablet personal computer (PC), a notebook PC, a portable game terminal, a portable/dongle-type mobile router, and a digital camera device) or an in-vehicle terminal such as a car navigation apparatus. The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) mounted on each of the terminals described above.

Application Examples Regarding a Base Station

First Application Example

Figure 13:
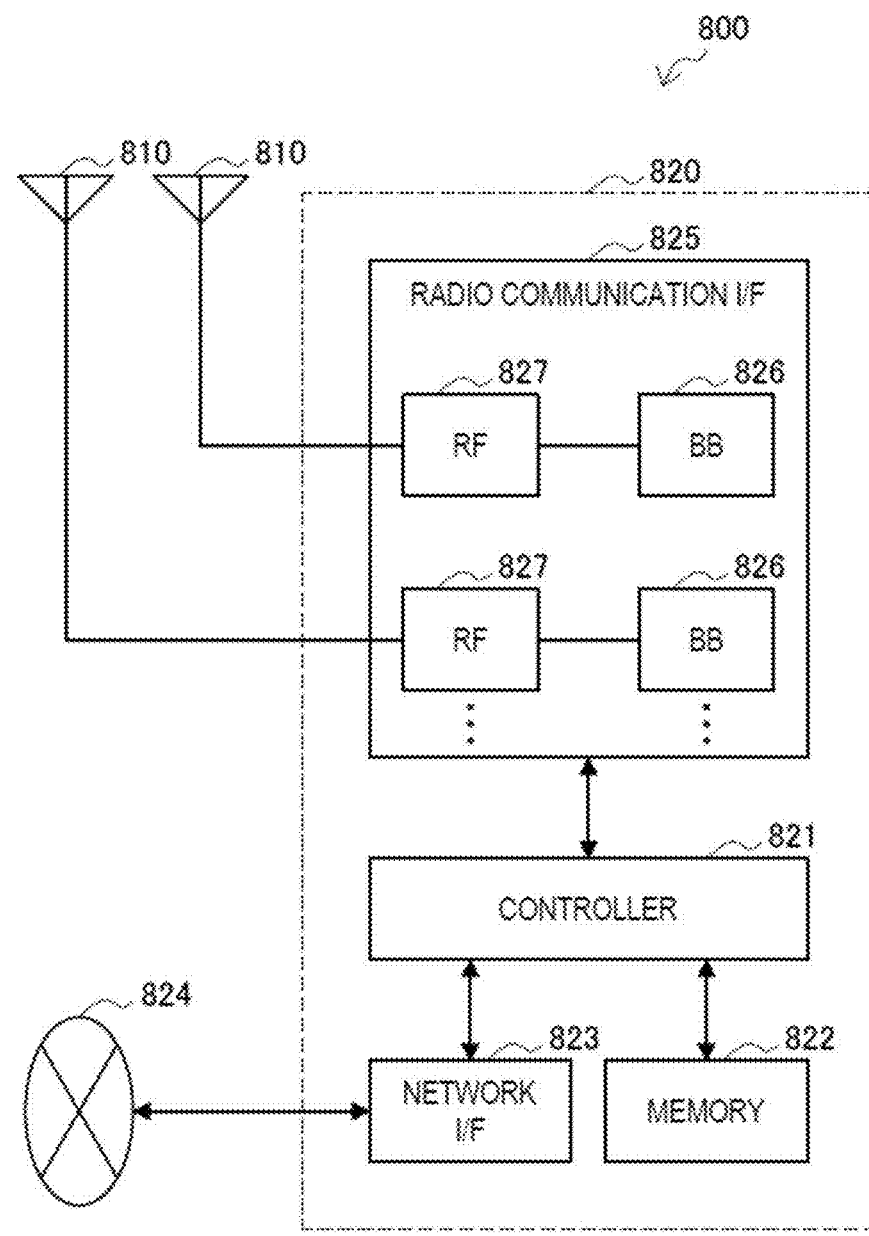
FIG. 13 is a block diagram showing a first example of a schematic configuration of an eNB or a gNB to which the technology of the present disclosure may be applied.

FIG. 13 is a block diagram showing a first example of an exemplary configuration of an eNB or a gNB to which the technology according to the present disclosure may be applied. It should be noted that the following description is given by taking the eNB as an example, which is also applicable to the gNB. An eNB 800 includes one or more antennas 810 and a base station apparatus 820. The base station apparatus 820 and each of the antennas 810 may be connected to each other via a radio frequency (RF) cable.

Each of the antennas 810 includes a single or multiple antennal elements (such as multiple antenna elements included in a multiple-input multiple-output (MIMO) antenna), and is used for the base station apparatus 820 to transmit and receive wireless signals. As shown in FIG. 13, the eNB 800 may include the multiple antennas 810. For example, the multiple antennas 810 may be compatible with multiple frequency bands used by the eNB 800. Although FIG. 13 shows the example in which the eNB 800 includes the multiple antennas 810, the eNB 800 may also include a single antenna 810.

The base station apparatus 820 includes a controller 821, a memory 822, a network interface 823, and a radio communication interface 825.

The controller 821 may be, for example, a CPU or a DSP, and operates various functions of a higher layer of the base station apparatus 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control and scheduling. The control may be performed in corporation with an eNB or a core network node in the vicinity. The memory 822 includes a RAM and a ROM, and stores a program executed by the controller 821 and various types of control data (such as terminal list, transmission power data and scheduling data).

The network interface 823 is a communication interface for connecting the base station apparatus 820 to a core network 824. The controller 821 may communicate with a core network node or another eNB via the network interface 823. In this case, the eNB 800, and the core network node or another eNB may be connected to each other via a logic interface (such as an S1 interface and an X2 interface). The network interface 823 may also be a wired communication interface or a wireless communication interface for wireless backhaul. If the network interface 823 is a wireless communication interface, the network interface 823 may use a higher frequency band for wireless communication than that used by the radio communication interface 825.

The radio communication interface 825 supports any cellular communication scheme (such as Long Term Evolution (LTE) and LTE-advanced), and provides wireless connection to a terminal located in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, Media Access Control (MAC), Radio Link Control (RLC), and a Packet Data Convergence Protocol (PDCP)). The BB processor 826 may have a part or all of the above-described logical functions instead of the controller 821. The BB processor 826 may be a memory storing communication control programs, or a module including a processor and a related circuit configured to execute the programs. Updating the program may allow the functions of the BB processor 826 to be changed. The module may be a card or a blade that is inserted into a slot of the base station apparatus 820. Alternatively, the module may also be a chip that is mounted on the card or the blade. Meanwhile, the RF circuit 827 may include, for example, a mixer, a filter, and an amplifier, and transmits and receives wireless signals via the antenna 810.

As shown in FIG. 13, the radio communication interface 825 may include the multiple BB processors 826. For example, the multiple BB processors 826 may be compatible with multiple frequency bands used by the eNB 800. The radio communication interface 825 may include multiple RF circuits 827, as shown in FIG. 13. For example, the multiple RF circuits 827 may be compatible with multiple antenna elements. Although FIG. 13 shows the example in which the radio communication interface 825 includes the multiple BB processors 826 and the multiple RF circuits 827, the radio communication interface 825 may also include a single BB processor 826 and a single RF circuit 827.

In the eNB 800 shown in FIG. 13, a transceiver of the electronic apparatus 300 or 400 may be implemented by the radio communication interface 825. At least a part of the functions may also be implemented by the controller 821. For example, the controller 821 may perform the functions of the first setting unit 301 and the first determining unit 302 or perform the functions of the first setting unit 301, the first determining unit 302, the second setting unit 401, and the second determining unit 402, to switch the user equipment to another BWP appropriately.

Second Application Example

Figure 14:
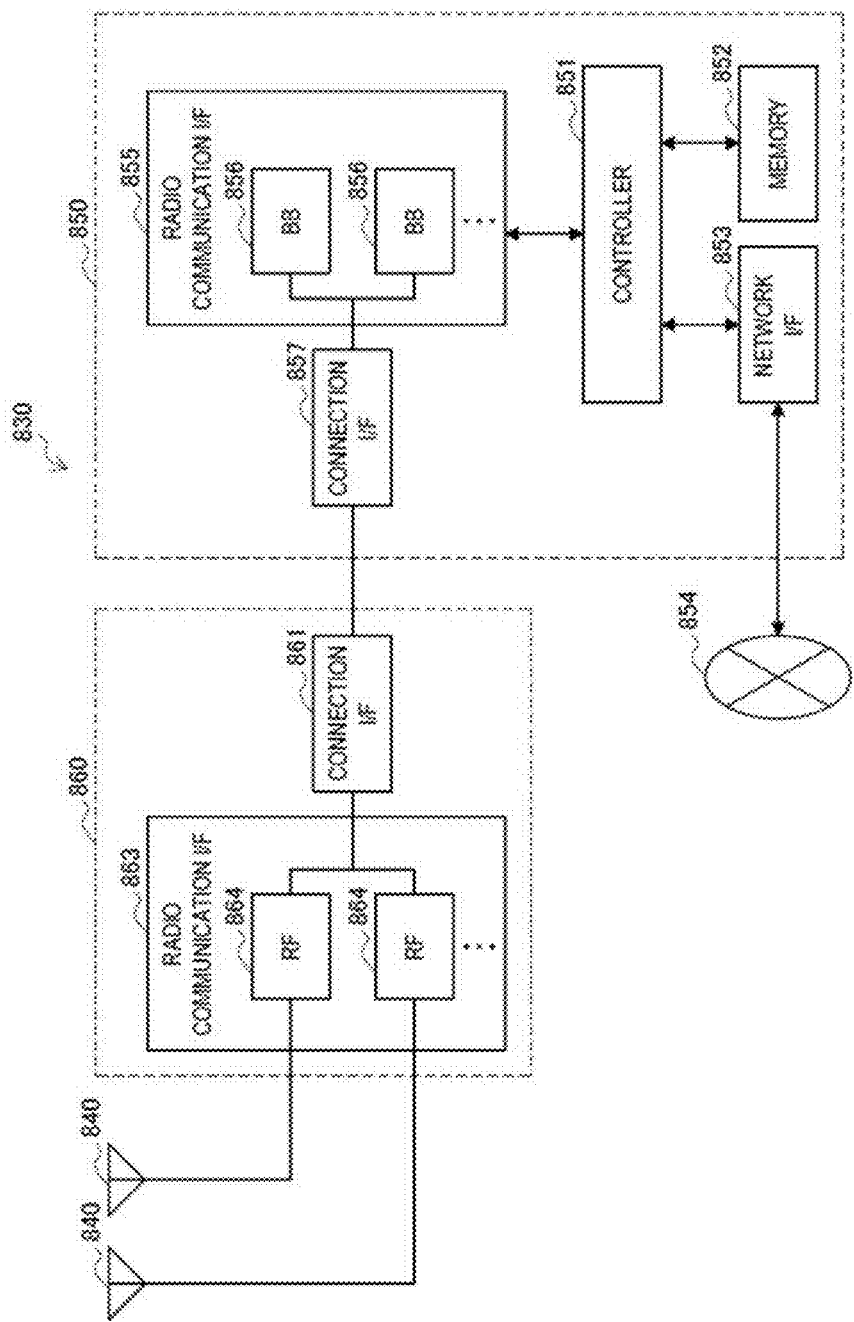
FIG. 14 is a block diagram showing a second example of a schematic configuration of an eNB or a gNB to which the technology of the present disclosure may be applied.

FIG. 14 is a block diagram showing a second example of an exemplary configuration of the eNB or gNB to which the technology according to the present disclosure may be applied. It should be noted that the following description is given by taking the eNB as an example, which is also applied to the gNB. An eNB 830 includes one or more antennas 840, a base station apparatus 850, and an RRH 860. The RRH 860 and each of the antennas 840 may be connected to each other via an RF cable. The base station apparatus 850 and the RRH 860 may be connected to each other via a high speed line such as an optical fiber cable.

Each of the antennas 840 includes a single or multiple antennal elements (such as multiple antenna elements included in an MIMO antenna), and is used for the RRH 860 to transmit and receive wireless signals. As shown in FIG. 14, the eNB 830 may include the multiple antennas 840. For example, the multiple antennas 840 may be compatible with multiple frequency bands used by the eNB 830. Although FIG. 14 shows the example in which the eNB 830 includes the multiple antennas 840, the eNB 830 may also include a single antenna 840.

The base station apparatus 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 13.

The radio communication interface 855 supports any cellular communication scheme (such as LTE and LTE-advanced), and provides wireless communication to a terminal located in a sector corresponding to the RRH 860 via the RRH 860 and the antenna 840. The radio communication interface 855 may typically include, for example, a BB processor 856. The BB processor 856 is the same as the BB processor 826 described with reference to FIG. 13, except that the BB processor 856 is connected to an RF circuit 864 of the RRH 860 via the connection interface 857. As show in FIG. 14, the radio communication interface 855 may include the multiple BB processors 856. For example, the multiple BB processors 856 may be compatible with multiple frequency bands used by the eNB 830. Although FIG. 14 shows the example in which the radio communication interface 855 includes the multiple BB processors 856, the radio communication interface 855 may also include a single BB processor 856.

The connection interface 857 is an interface for connecting the base station apparatus 850 (radio communication interface 855) to the RRH 860. The connection interface 857 may also be a communication module for communication in the above-described high speed line that connects the base station apparatus 850 (radio communication interface 855) to the RRH 860.

The RRH 860 includes a connection interface 861 and a radio communication interface 863.

The connection interface 861 is an interface for connecting the RRH 860 (radio communication interface 863) to the base station apparatus 850. The connection interface 861 may also be a communication module for communication in the above-described high speed line.

The radio communication interface 863 transmits and receives wireless signals via the antenna 840. The radio communication interface 863 may typically include, for example, the RF circuit 864. The RF circuit 864 may include, for example, a mixer, a filter and an amplifier, and transmits and receives wireless signals via the antenna 840. The radio communication interface 863 may include multiple RF circuits 864, as shown in FIG. 14. For example, the multiple RF circuits 864 may support multiple antenna elements. Although FIG. 14 shows the example in which the radio communication interface 863 includes the multiple RF circuits 864, the radio communication interface 863 may also include a single RF circuit 864.

In the eNB 800 shown in FIG. 14, a transceiver of the electronic apparatus 300 or 400 may be implemented by the radio communication interface 825. At least a part of the functions may also be implemented by the controller 821. For example, the controller 821 may perform the functions of the first setting unit 301 and the first determining unit 302 or perform the functions of the first setting unit 301, the first determining unit 302, the second setting unit 401, and the second determining unit 402, to switch the user equipment to another BWP appropriately.

Application Examples Regarding User Equipment

First Application Example

Figure 15:
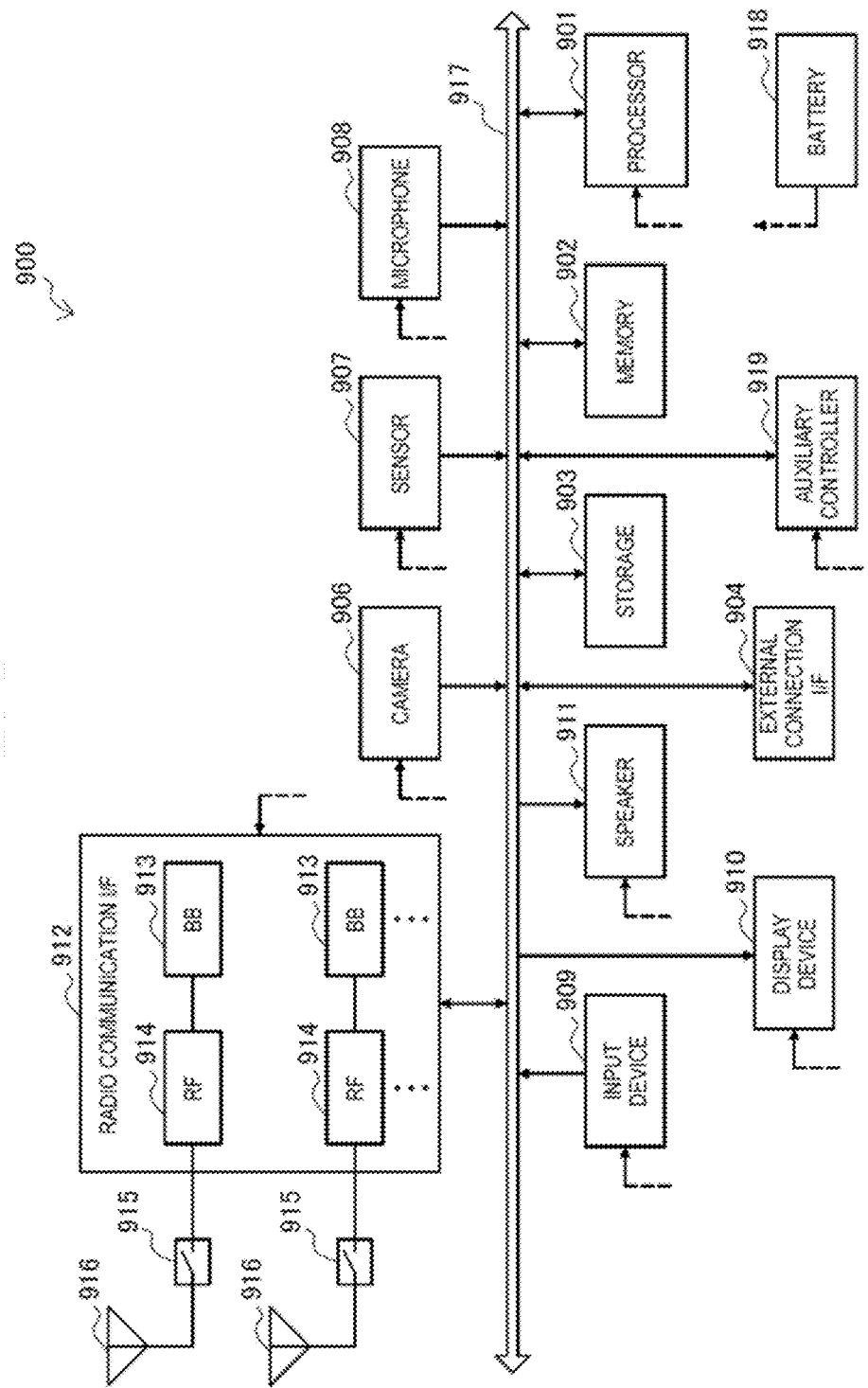
FIG. 15 is a block diagram showing an example of a schematic configuration of a smartphone to which the technology according to the present disclosure may be applied.

FIG. 15 is a block diagram illustrating an example of exemplary configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes a RAM and a ROM, and stores a program executed by the processor 901 and data. The storage 903 may include a storage medium such as a semiconductor memory and a hard disk. The external connection interface 904 is an interface for connecting an external device (such as a memory card and a universal serial bus (USB) device) to the smartphone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetism sensor, and an acceleration sensor. The microphone 908 converts sounds that are inputted to the smartphone 900 to audio signals. The input device 909 includes, for example, a touch sensor configured to detect touch onto a screen of the display device 910, a keypad, a keyboard, a button, or a switch, and receives an operation or information inputted from a user. The display device 910 includes a screen (such as a liquid crystal display (LCD) and an organic light-emitting diode (OLED) display), and displays an output image of the smartphone 900. The speaker 911 converts audio signals that are outputted from the smartphone 900 to sounds.

The radio communication interface 912 supports any cellular communication scheme (such as LTE and LTE-advanced), and performs a wireless communication. The radio communication interface 912 may include, for example, a BB processor 913 and an RF circuit 914. The BB processor 913 may perform, for example, encoding/decoding, modulating/demodulating, and multiplexing/de-multiplexing, and perform various types of signal processing for wireless communication. The RF circuit 914 may include, for example, a mixer, a filter and an amplifier, and transmits and receives wireless signals via the antenna 916. It should be noted that although FIG. 15 shows a case that one RF link is connected to one antenna, which is only illustrative, and a case that one RF link is connected to multiple antennas through multiple phase shifters may also exist. The radio communication interface 912 may be a chip module having the BB processor 913 and the RF circuit 914 integrated thereon. The radio communication interface 912 may include multiple BB processors 913 and multiple RF circuits 914, as shown in FIG. 15. Although FIG. 15 shows the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of wireless communication scheme such as a short-distance wireless communication scheme, a near field communication scheme, and a radio local area network (LAN) scheme. In this case, the radio communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the radio communication interface 912.

Each of the antennas 916 includes a single or multiple antenna elements (such as multiple antenna elements included in an MIMO antenna) and is used for the radio communication interface 912 to transmit and receive wireless signals. The smartphone 900 may include the multiple antennas 916, as shown in FIG. 15. Although FIG. 15 shows the example in which the smartphone 900 includes the multiple antennas 916, the smartphone 900 may also include a single antenna 916.

Furthermore, the smartphone 900 may include the antenna 916 for each wireless communication scheme. In this case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smart phone 900 shown in FIG. 15 via feeder lines that are partially shown as dashed lines in FIG. 15. The auxiliary controller 919, operates a minimum necessary function of the smart phone 900, for example, in a sleep mode.

In the smart phone 900 shown in FIG. 15, the transceiver of the electronic apparatus 100 or 200 may be implemented by the radio communication interface 912. At least a part of the functions may be implemented by the processor 901 or the auxiliary controller 919. For example, the processor 901 or the auxiliary controller 919 may perform the functions of the first timer unit 101 and the first switching unit 102, or perform the functions of the first timer unit 101, the first switching unit 102, the second timer unit 201 and the second switching unit 202 to switch the user equipment to another BWP.

Second Application Example

Figure 16:
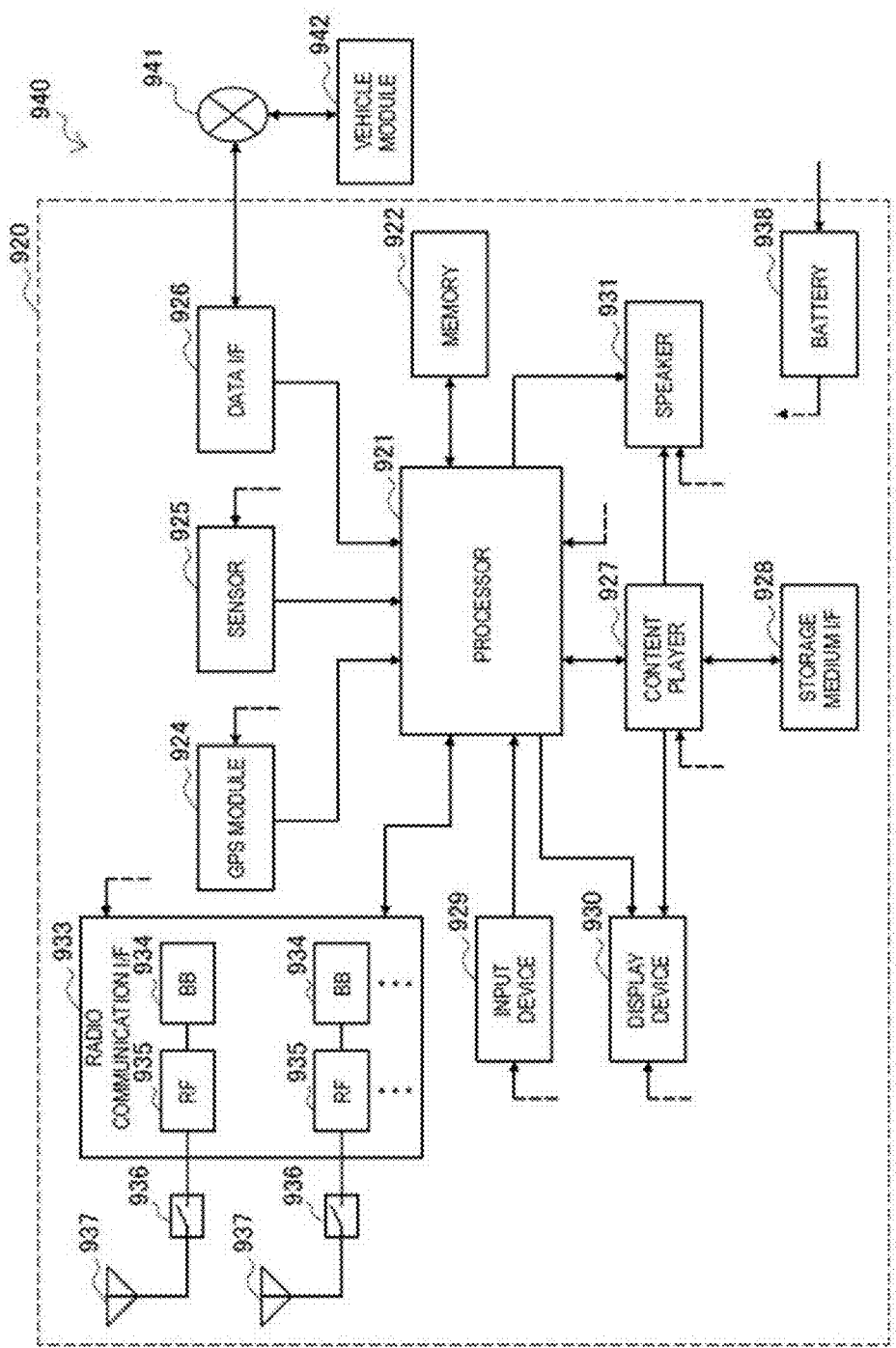
FIG. 16 is a block diagram showing an example of a schematic configuration of a car navigation device to which the technology of the present disclosure may be applied.

FIG. 16 is a block diagram showing an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example a CPU or a SoC, and controls a navigation function and additional function of the car navigation apparatus 920. The memory 922 includes RAM and ROM, and stores a program that is executed by the processor 921, and data.

The GPS module 924 determines a position (such as latitude, longitude and altitude) of the car navigation apparatus 920 by using GPS signals received from a GPS satellite. The sensor 925 may include a group of sensors such as a gyro sensor, a geomagnetic sensor and an air pressure sensor. The data interface 926 is connected to, for example, an in-vehicle network 941 via a terminal that is not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or information inputted from a user. The display device 930 includes a screen such as an LCD or OLED display, and displays an image of the navigation function or content that is reproduced. The speaker 931 outputs a sounds for the navigation function or the content that is reproduced.

The radio communication interface 933 supports any cellular communication scheme (such as LTE and LTE-Advanced), and performs wireless communication. The radio communication interface 933 may typically include, for example, a BB processor 934 and an RF circuit 935. The BB processor 934 may perform, for example, encoding/decoding, modulating/demodulating and multiplexing/demultiplexing, and perform various types of signal processing for wireless communication. The RF circuit 935 may include, for example, a mixer, a filter and an amplifier, and transmits and receives wireless signals via the antenna 937. The radio communication interface 933 may also be a chip module having the BB processor 934 and the RF circuit 935 integrated thereon. The radio communication interface 933 may include multiple BB processors 934 and multiple RF circuits 935, as shown in FIG. 16. Although FIG. 16 shows the example in which the radio communication interface 933 includes the multiple BB processors 934 and the multiple RF circuits 935, the radio communication interface 933 may also include a single BB processor 934 and a single RF circuit 935.

Furthermore, in addition to a cellular communication scheme, the radio communication interface 933 may support another type of wireless communication scheme such as a short-distance wireless communication scheme, a near field communication scheme, and a wireless LAN scheme. In this case, the radio communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the radio communication interface 933.

Each of the antennas 937 includes a single or multiple antenna elements (such as multiple antenna elements included in an MIMO antenna), and is used by the radio communication interface 933 to transmit and receive wireless signals. As shown in FIG. 16, the car navigation apparatus 920 may include the multiple antennas 937. Although FIG. 16 shows the example in which the car navigation apparatus 920 includes the multiple antennas 937, the car navigation apparatus 920 may also include a single antenna 937.

Furthermore, the car navigation apparatus 920 may include the antenna 937 for each wireless communication scheme. In this case, the antenna switches 936 may be omitted from the configuration of the car navigation apparatus 920.

The battery 938 supplies power to the blocks of the car navigation apparatus 920 shown in FIG. 16 via feeder lines that are partially shown as dash lines in FIG. 16. The battery 938 accumulates power supplied from the vehicle.

In the car navigation device 920 shown in FIG. 16, the transceiver of the electronic apparatus 100 or 200 may be implemented by the radio communication interface 912. At least a part of the functions may be implemented by the processor 901 or the auxiliary controller 919. For example, the processor 901 or the auxiliary controller 919 may perform the functions of the first timer unit 101 and the first switching unit 102, or perform the functions of the first timer unit 101, the first switching unit 102, the second timer unit 201 and the second switching unit 202 to switch the user equipment to another BWP.

The technology of the present disclosure may also be implemented as an in-vehicle system (or a vehicle) 940 including one or more blocks of the car navigation apparatus 920, the in-vehicle network 941 and a vehicle module 942. The vehicle module 942 generates vehicle data (such as a vehicle speed, an engine speed, and failure information), and outputs the generated data to the in-vehicle network 941.

The basic principle of the present disclosure has been described above in conjunction with particular embodiments. However, as can be appreciated by those ordinarily skilled in the art, all or any of the steps or components of the method and apparatus according to the disclosure can be implemented with hardware, firmware, software or a combination thereof in any computing device (including a processor, a storage medium, etc.) or a network of computing devices by those ordinarily skilled in the art in light of the disclosure of the disclosure and making use of their general circuit designing knowledge or general programming skills.

Moreover, the present disclosure further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present disclosure. The memory medium includes but is not limited to soft disc, optical disc, magnetic optical disc, memory card, memory stick and the like.

In the case where the present disclosure is realized with software or firmware, a program constituting the software is installed in a computer with a dedicated hardware structure (e.g. the general computer 1700 shown in FIG. 17) from a storage medium or network, wherein the computer is capable of implementing various functions when installed with various programs.

Figure 17:
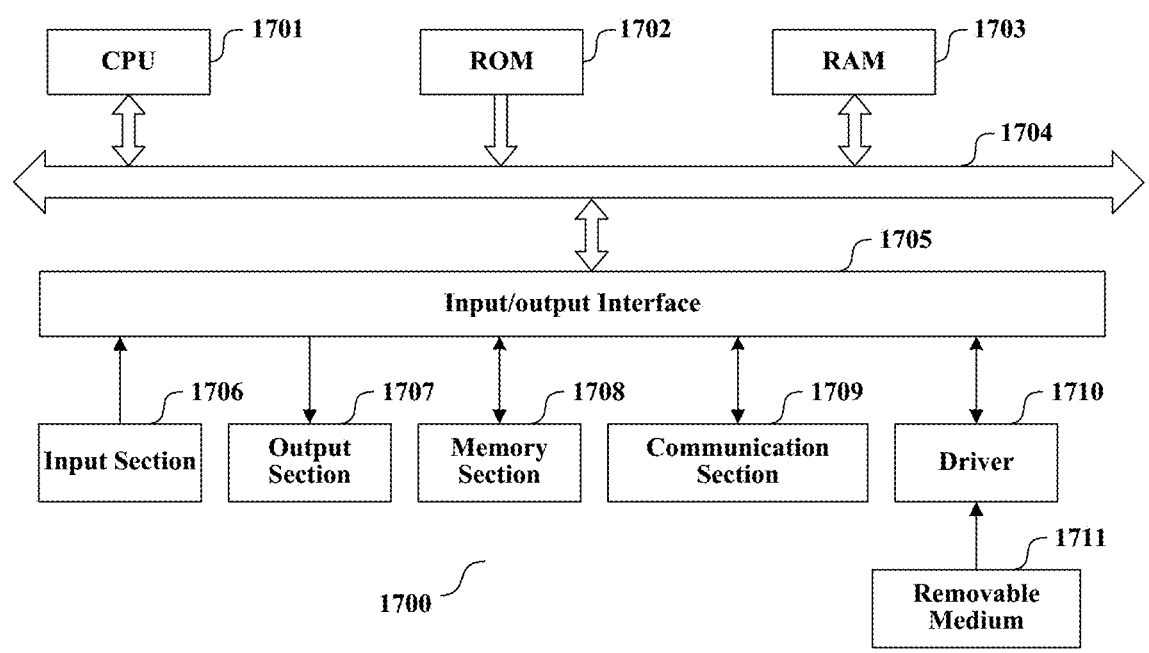
FIG. 17 is a block diagram of an exemplary block diagram illustrating the structure of a general purpose personal computer capable of realizing the method and/or device and/or system according to the embodiments of the present disclosure.

In FIG. 17, a central processing unit (CPU) 1701 executes various processing according to a program stored in a read-only memory (ROM) 1702 or a program loaded to a random access memory (RAM) 1703 from a memory section 1708. The data needed for the various processing of the CPU 1701 may be stored in the RAM 1703 as needed. The CPU 1701, the ROM 1702 and the RAM 1703 are linked with each other via a bus 1704. An input/output interface 1705 is also linked to the bus 1704.

The following components are linked to the input/output interface 1705: an input section 1706 (including keyboard, mouse and the like), an output section 1707 (including displays such as a cathode ray tube (CRT), a liquid crystal display (LCD), a loudspeaker and the like), a memory section 1708 (including hard disc and the like), and a communication section 1709 (including a network interface card such as a LAN card, modem and the like). The communication section 1709 performs communication processing via a network such as the Internet. A driver 1710 may also be linked to the input/output interface 1705, if needed. If needed, a removable medium 1711, for example, a magnetic disc, an optical disc, a magnetic optical disc, a semiconductor memory and the like, may be installed in the driver 1710, so that the computer program read therefrom is installed in the memory section 1708 as appropriate.

In the case where the foregoing series of processing is achieved through software, programs forming the software are installed from a network such as the Internet or a memory medium such as the removable medium 1711.

It should be appreciated by those skilled in the art that the memory medium is not limited to the removable medium 1711 shown in FIG. 17, which has program stored therein and is distributed separately from the apparatus so as to provide the programs to users. The removable medium 1711 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1702 and the memory section 1708 in which programs are stored, and can be distributed to users along with the device in which they are incorporated.

To be further noted, in the apparatus, method and system according to the present disclosure, the respective components or steps can be decomposed and/or recombined. These decompositions and/or recombinations shall be regarded as equivalent solutions of the disclosure. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the present disclosure have been described above in detail in connection with the drawings, it shall be appreciated that the embodiments as described above are merely illustrative rather than limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. An electronic apparatus for wireless communications, comprising:
   processing circuitry, configured to:
   set a first timer for timing activation time of a current bandwidth part (BWP) for use by user equipment on an unlicensed frequency band;
   switch the user equipment to another BWP on the unlicensed frequency band when the first timer expires;
   set a second timer for timing time during which the user equipment does not occupy the current BWP in an activated state to perform transmission; and
   determine whether to switch the user equipment to another BWP on the unlicensed frequency band based on the second timer;
   wherein the processing circuitry acquires the timing duration of the second timer via a radio resource control (RRC) signaling.

2. The electronic apparatus according to claim 1, wherein, the processing circuitry is configured to interrupt the second timer when the user equipment receives data from a base station or when a channel detection by the user equipment indicates that a current channel is available.

3. The electronic apparatus according to claim 1, wherein, the processing circuitry is configured to start the first timer when the current BWP is activated, wherein a timing duration of the first timer is variable.

4. The electronic apparatus according to claim 3, wherein, the timing duration of the first timer is determined by a base station in accordance with a characteristic of data to be transmitted.

5. The electronic apparatus according to claim 3, wherein, the processing circuitry acquires the timing duration of the first timer via the RRC signaling.

6. The electronic apparatus according to claim 1, wherein, a timing duration of the second timer is shorter than a timing duration of the first timer.

7. The electronic apparatus according to claim 1, wherein, a timing duration of the second timer is a length of N pieces of maximum channel occupation time, wherein N is a natural number which is equal to or larger than 2.

8. The electronic apparatus according to claim 1, wherein, the processing circuitry is further configured to switch the user equipment to a default BWP on the unlicensed frequency band when the first timer expires or the second timer expires.

9. The electronic apparatus according to claim 8, wherein, the processing circuitry is further configured to acquire scheduling downlink control information on the default BWP, to determine a new BWP to be activated, and switch the user equipment to the new BWP.

10. The electronic apparatus according to claim 1, wherein, the processing circuitry is further configured to switch the user equipment to a new BWP when the first timer expires or the second timer expires, wherein the processing circuitry determines the new BWP via scheduling downlink control information received on the licensed frequency band and activates the new BWP.

11. The electronic apparatus according to claim 1, wherein, the switching comprises de-activating the current BWP and activating another BWP.

12. The electronic apparatus according to claim 1, wherein, the processing circuitry is configured to continue occupying the current channel for a time duration of one piece of MCOT, in a case that channel detection indicates that the current channel is available, when the first timer expires.

13. The electronic apparatus according to claim 1, wherein, the processing circuitry is further configured to detect reference signal receiving power of a current beam, and determine, based on the reference signal receiving power, whether to switch to another BWP.

14. An electronic apparatus for wireless communications, comprising:
processing circuitry, configured to:
set a first timer for user equipment, the first timer being used for timing activation time of a current bandwidth part (BWP) for use by the user equipment on an unlicensed frequency band;
determine that the user equipment is to be switched to another BWP on the unlicensed frequency band when the first timer expires;
set a second timer for the user equipment, the second timer being used for timing time during which the user equipment does not occupy the current BWP in an activated state to perform transmission; and
determine whether the user equipment is to be switched to another BWP on the unlicensed frequency band based on the second timer.

15. The electronic apparatus according to claim 14, wherein, the processing circuitry is configured to start the first timer when the current BWP is activated, wherein a timing duration of the first timer is variable.

16. The electronic apparatus according to claim 14, wherein a timing duration of the second timer is shorter than a timing duration of the first timer.

17. The electronic apparatus according to claim 14, wherein, the processing circuitry is further configured to determine that the user equipment is to be switched to a default BWP on the unlicensed frequency band when the first timer expires or the second timer expires, or
wherein, the processing circuitry is further configured to transmit the scheduling downlink control information on the licensed frequency band when the first timer expires or the second timer expires, to notify the user equipment of a new BWP to be activated, and the user equipment is to be switched to the new BWP.

18. A method for wireless communications, comprising:
setting a first timer for timing activation time of a current bandwidth part (BWP) for use by user equipment on an unlicensed frequency band;
switching the user equipment to another BWP on the unlicensed frequency band when the first timer expires;
setting a second timer for timing time during which the user equipment does not occupy the current BWP in an activated state to perform transmission; and
switching the user equipment to another BWP on the unlicensed frequency band when the second timer expires.

* * * * *